United States Patent [19]

Hashimoto

[11] Patent Number: 5,150,783
[45] Date of Patent: Sep. 29, 1992

[54] TUBULAR BELT CONVEYOR

[75] Inventor: Kunio Hashimoto, Kitakyushu, Japan

[73] Assignee: Kabushiki Kaisha Nihon Pipe Conveyor Kenkyusho, Kitakyushu, Japan

[21] Appl. No.: 673,738

[22] Filed: Mar. 22, 1991

[30] Foreign Application Priority Data

Mar. 23, 1990 [JP] Japan .................................. 2-72175

[51] Int. Cl.⁵ .............................................. B65G 15/08
[52] U.S. Cl. ................................................... 198/819
[58] Field of Search ....................................... 198/819

[56] References Cited

U.S. PATENT DOCUMENTS 3,338,383 8/1967 Hashimoto ........................ 198/819
4,402,395 9/1983 Hashimoto ........................ 198/819
4,823,941 4/1989 Mindich ............................ 198/819

FOREIGN PATENT DOCUMENTS 2094741 9/1982 United Kingdom .

Primary Examiner—Robert P. Olszewski
Assistant Examiner—Cheryl L. Gastineau
Attorney, Agent, or Firm—Zarley, McKee, Thomte, Voorhees & Sease

[57] ABSTRACT

A tubular belt conveyor in which an endless belt is wound round drive and driven rollers such that an object to be conveyed can be wrapped in the belt and conveyed in the wrapped-in state, comprises supporting frames with a plurality of holding rollers, horizontal rollers, each being adapted to support the bottom of the belt and pivoted on a bracket which is attached to a coupling member of the supporting frame in such a manner that the orientation thereof can be varied, and vertical rollers, each being adapted to support a curved inner peripheral side portion of the belt adjacent to the horizontal roller and pivoted on a bracket in such a manner that the orientation thereof can be varied, whereby the sagging of the belt can be surely prevented, the twisting of the belt can be readily corrected, and the number of holding rollers can be reduced.

1 Claim, 5 Drawing Sheets

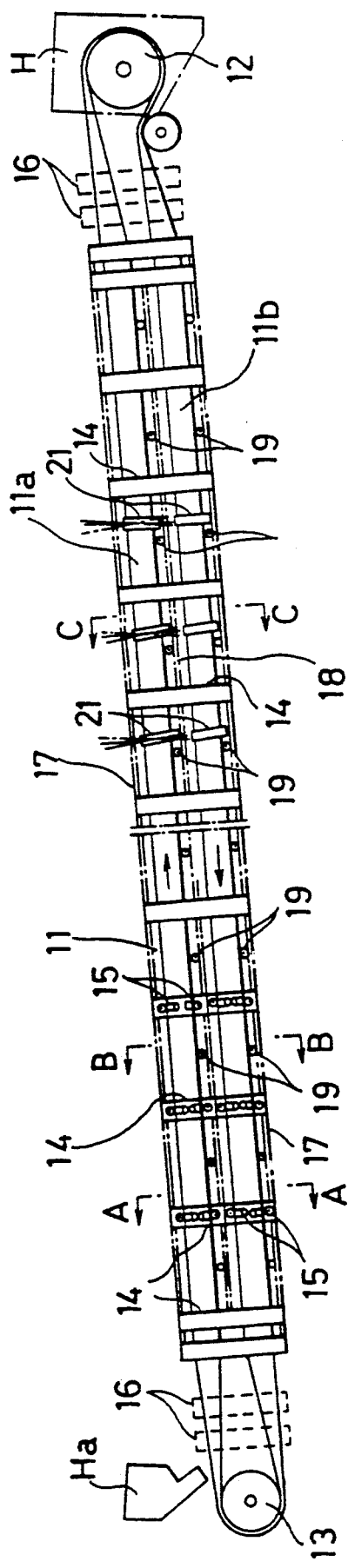
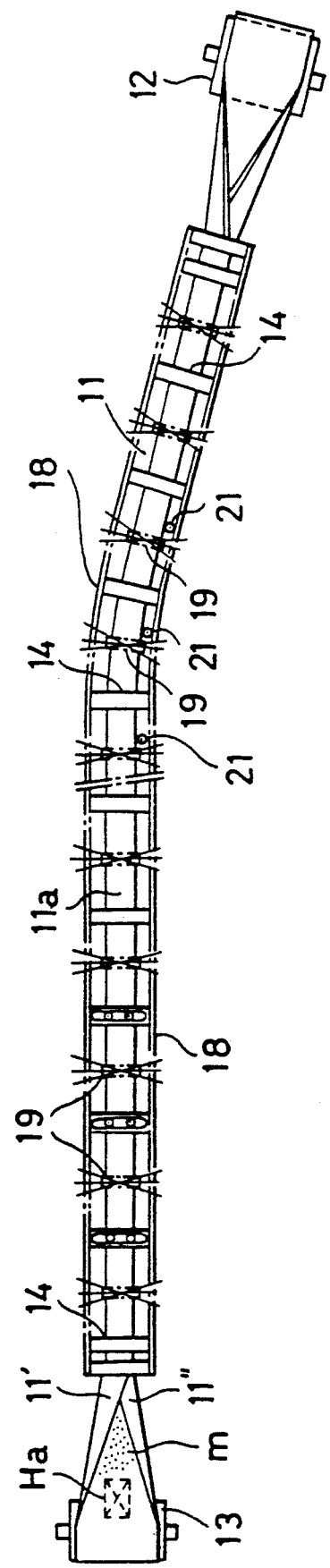

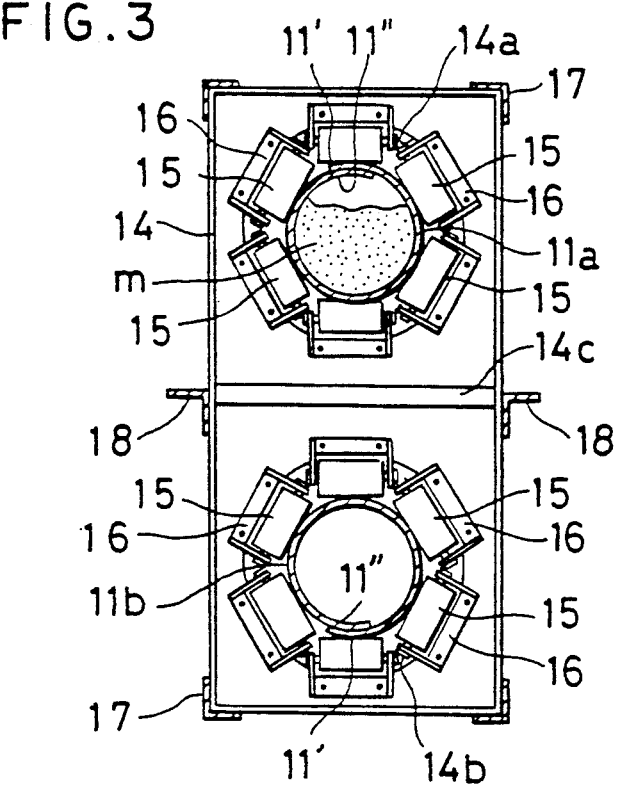
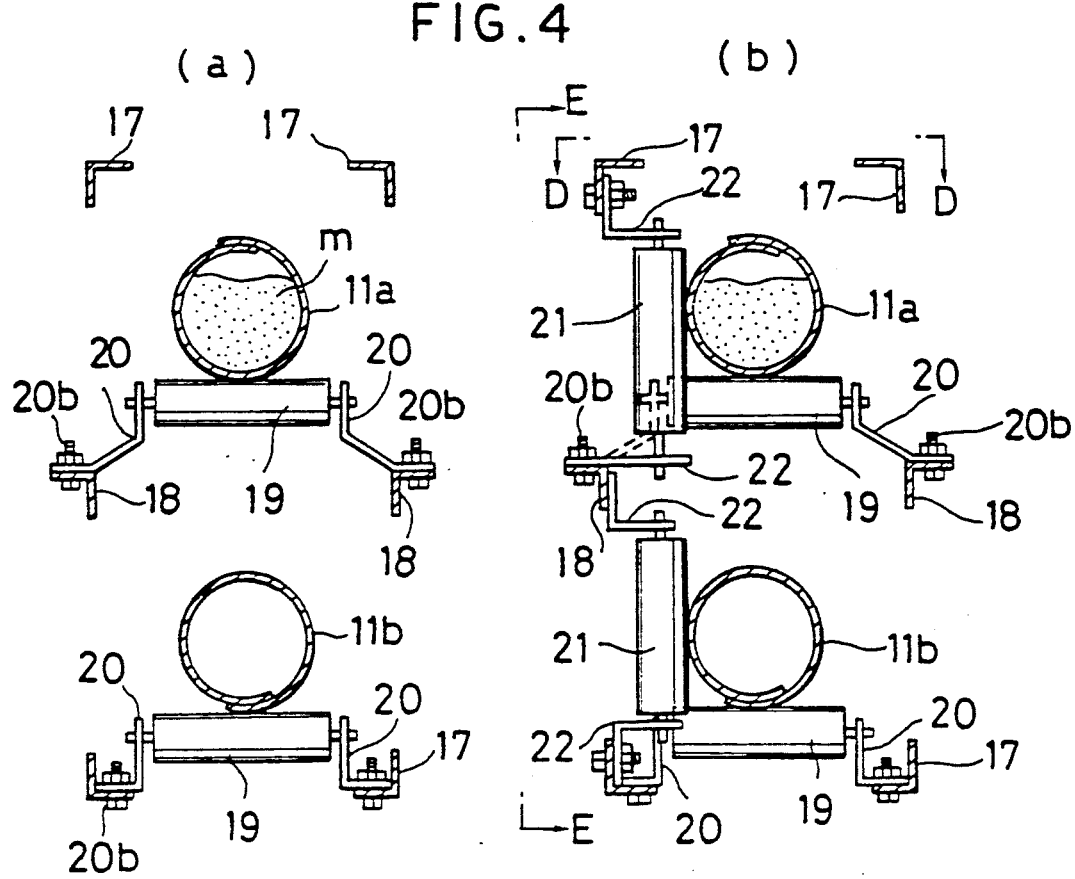

TUBULAR BELT CONVEYOR

BACKGROUND OF THE INVENTION

The present invention relates to a tubular belt conveyor constructed so as to prevent a tubular endless belt for conveying objects to be conveyed such as powdered/grained objects or pieces in a wrapped-in state from being sagged and twisted during the running thereof and to reduce the number of supporting frames to promote saving.

As means for conveying the objects to be conveyed (hereinafter referred to as conveyed objects) such as the powder/grained objects or pieces to a considerably remote place, there is generally known a tubular belt conveyor of the type shown in FIGS. 7 to 9.

That is, a flexible endless belt 1 has a tendency to roll up owing to the elasticity of its own. However, the end portions thereof over driven roller 3 and drive roller 2 are unrolled into flattened form and wound round the rollers, the upper section thereof extending from the driven roller 3 toward the drive roller constitutes an outward belt 1a, while the lower section thereof extending from the drive roller 2 toward the driven roller 3 constitutes a return belt 1b, and supporting frames 4 are provided along the outward belt 1a and the return belt 1b at predetermined intervals. The individual supporting frames 4 are coupled to one another by upper, lower, right and left coupling members 8 and are divided into upper and lower parts by partition plates 4c. Passages 4a and 4b through which the belt is inserted and formed in the upper and lower parts of the frame 4. Several holding rollers 5 are provided on the periphery of each of the passages 4a and 4b via brackets 5a so as to lie along one circumference and in such a manner that portions of the outward and return belts 1a and 1b which are rolled up into tubular form can be supported by the holding rollers 5. In positions immediately after a position of the belt which runs the driven roller 3 and in positions in front of the drive roller 2, there are provided a plurality of rolling/unrolling frames 6 which are provided on upper and lower portions thereof with deformation rollers 7 for supporting three parts, that is the bottom or the upper part and the both sides of the belt.

Thus, the outward belt 1a which runs over the driven roller 3 thereunder and is unrolled into the flattened form is roller up into the tubular form owing to its tendency to roll up and with the aid of the deformation rollers 7 on the rolling/unrolling frame 6, during which an object to be conveyed (conveyed object) "m" is put on the belt from a hopper "Ha". The outward belt 1a wraps the conveyed object therein by superposing its side edge 1" on its side edge 1', passes through the upper insert passage 4a in each of the supporting frames and its again unrolled into the flattened form by the upper deformation roller on the rolling/unrolled frame 6 on the side of the drive roller in a position in which it has passed by the frontmost supporting frame 4 and the conveyed object "m" is thrown down into a receiving pipe "Hb" during the belt 1a is running over the drive roller 2.

Next, the outward belt 1a turns to the return belt 1b which is, then, rolled up by the lower deformation roller on the rolling/unrolling frame 6, passes through the lower insert passage 4b in each of the supporting frames 4, is unrolled by the lower deformation roller 7 on the rolling/unrolling frame 6 on the side of the driven roller, and then runs over the driven roller 3 to complete one cycle.

However, in the tubular belt conveyor of the abovedmentioned type, the tubular belt is twisted along the axis thereof due to a) uneven wear of each sliding part due to the long-term use thereof, b) positional misalignment of individual holding rollers, c) uneven wear of each holding roller, d) manufacturing error in accuracy of each component, and others. Accordingly, as disclosed in Japanese Laid Open Patent Publication No. 141304/82, there has been proposed an apparatus in which as shown in FIGS. 10(a) and 10(b), a receiving plate 4d is extendingly provided behind the partition plate 4c of the supporting frame 4 and the center of a bracket 5a' for rotatably supporting a correction roller 5' which orthogonally abuts against the bottom of the outward belt 1a is pivoted on the receiving plate 4d in such a manner that in a case that the outward belt 1a is twisted, the correction roller 5' is inclined together with the bracket 5a' to the left or right with respect to a direction in which the belt runs by a handle 5d' which extends from the bracket 5a' in a lateral direction.

In the tubular belt conveyor, the twists about the axis to be generated during the running of the tubular belt occur in many and unspecific portions thereof, so that it is difficult to select in advance position in which the twist preventing means as mentioned above is set. Therefore, the twist preventing means should be provided on all of the supporting frames, which means that not only the number of the supporting frames can not be reduced but also the same number of the twist preventing means as that of the supporting frames is needed, which is very wasteful. In addition, the provision of the twist preventing means is of no use to prevent the tubular belt from being sagged.

The present invention has been contemplated in view of the above mentioned drawbacks associated with the prior art. Accordingly, an object of the present invention is to provide an economic tubular belt conveyor in which the twisting of the tubular belt can be properly corrected and the sagging of the belt between the supporting frames can also be prevented, and a space between the supporting frames can be widened, by which the number of the supporting rollers can be reduced.

SUMMARY OF THE INVENTION

In order to attain the above mentioned object, accordingly to the present invention, there is provided a tubular belt conveyor of the type in which an endless belt is round drive and driven roller so as to run thereover, an upper section of the endless belt constituting an outward belt and a lower section thereof constituting a return belt, the outward and return belts are rolled up into tubular form substantially along the entire length thereof by deformation means in such a manner that an object to be conveyed can be conveyed in a state that the conveyed object is wrapped in the outward belt, firstly characterized in that supporting frames provided with upper and lower stages of insert passages and a plurality of holding rollers which are provided on the peripheries of the passages and horizontal rollers situated in the middle between the juxtaposed supporting frame so as to support the bottom of the tubular belt orthogonal thereto are alternately provided on the tubular outward and return belts substantially along the entire length thereof at predetermined intervals and each of the horizontal rollers is pivotally supported on each bracket which is attached to a coupling member of the supporting frame in such a manner that the orientation thereof can be varied with respect to a belt running direction and secondarily characterized in that vertical rollers for supporting curved inner peripheral side portions of the outward and return belts are respectively provided on transversely curved portions of the belts adjacent to the horizontal rollers for supporting the bottom of the belts and each of the vertical rollers is pivotally supported on each bracket which is attached to the coupling member of the supporting frame in such a manner that the orientation thereof can be varied with respect to the belt running direction.

The belt which has run over the driven roller in the flattened form acts as the outward belt which is, then, roller up into the tubular form by the deformation means while wrapping therein the conveyed object which is put on the belt, passes through the upper insert passages of the supporting frames alternatively over the upper horizontal and vertical rollers in the tubularly roller up state, and then is unrolled by the deformation means immediately after it has passed through the frontmost supporting frame. While the belt is running over the drive roller, the conveyed object is thrown down onto the belt. Thereafter, the belt, acting as the return belt, is again rolled up into the tubular form, alternately passes through the lower insert passages of the supporting frames and over the lower horizontal and vertical rollers, is again unrolled in front of the driven roller, and runs over the driven roller. In a case that a twist is generated in the belt during the above-mentioned operation, the horizontal or vertical roller corresponding to the twisted portion is appropriately inclined in the tubular-shaped belt running direction to correct the twisted portion.

Other objects, advantages and novel features of the present invention will become apparent from the following detailed description of the invention when considered in conjunction with the accompanying drawings.

BRIEF DESCRIPTION OF THE DRAWINGS

FIG. 1 is a side view of a tubular belt conveyor according to the present invention.

FIG. 2 is a plan view of the conveyor shown in FIG. 1.

FIG. 3 is a cross-sectional front view taken along the line A—A in FIG. 1.

FIG. 4(a) is a cross-sectional front view taken along the line B—B in FIG. 1.

FIG. 4(b) is a cross-sectional front view taken along the line C—C in FIG. 1.

DESCRIPTION OF PREFERRED EMBODIMENTS OF THE INVENTION

Figure 5A:
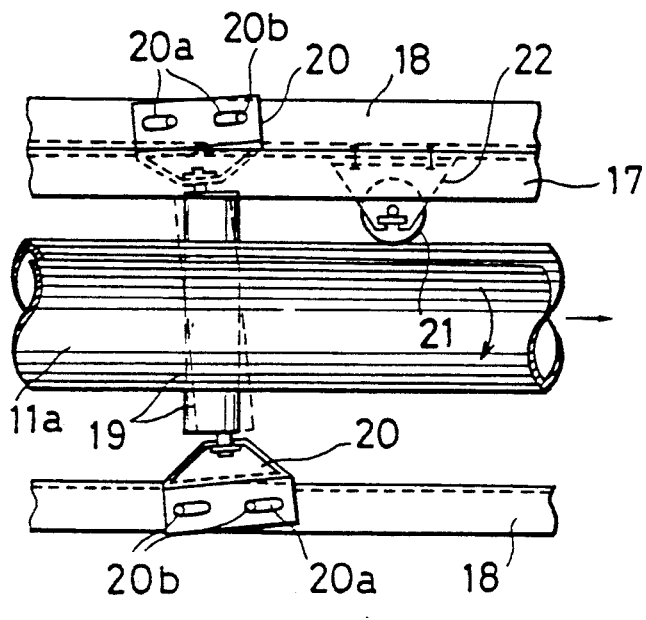
FIG. 5A is plan view viewed from a direction of the line D—D in FIG. 4(b).

FIGS. 1 and 2 generally show an example of the tubular belt conveyor according to the present invention. In the side view of FIG. 1, the tubular belt conveyor is linearly inclined from the side of a driven roller 13 toward the side of a drive roller 12. On the other hand, in the plan view of FIG. 2 the conveyor is partially curved in a transverse direction.

And, an flexible endless belt 11 is unrolled into flattened form at one end thereof over the driven roller 13 and the other end over the drive roller 12, and an upper section thereof extending from the driven roller 13 toward the drive roller 12 constitutes an outward belt 11a, while a lower section thereof extending from the drive roller 12 toward the driven roller 13 constitutes a return belt 11b. Supporting frames 14 are provided around the outward belt 11a and return belt 11b substantially along the entire length thereof at predetermined intervals (although, in the example shown in the drawings, the space between the supporting frames at each end of the belt is narrowed in order to smoothly change the configuration of the belt, the space may not be so narrowed as the case may be). As shown in FIG. 3, the supporting frame 14 is partitioned into upper and lower sections by a central partition member 14c. Passages 14a and 14b through which the belts are inserted are respectively provided in the upper and lower sections of the frame. Several holding rollers 15 are provided on the periphery of each of the insert passages 14a and 14b and attached to the supporting frame 14 through brackets 16 in such a manner that the tubularly rolled-up portions of the outward and return belts 11a and 11b can be supported by the holding rollers 15. Every plurality of rolling/unrolling frames 16 provided with upper and lower deformation rollers (not shown) for supporting three parts, that is, the bottom, or an upper part and the both sides of the belts are provided in positions immediately behind the position in which the belt has run over the driven roller 13 and in front of the drive roller 12.

The individual supporting frames 14 are coupled to one another by upper, lower left and right chevron-shaped outer coupling rods 17 and the central partition members 14c are coupled to one another by intermediate angular coupling rods 18 in the same manner as the above. In each central position between the supporting frames which are juxtaposed one following an another, there is provided a horizontal roller 19 for supporting the bottom of each of the outward and return belts 11a and 11b as shown in FIG. 4(b) generally orthogonal to the belt. These horizontal rollers 19 are rotatably pivoted on brackets 20 on the both sides thereof. As shown in FIG. 5A, the individual brackets 20 are attached to the intermediate coupling rods 18 on the both sides and the lower outer coupling rods on the both sides by screw rods 20 through a plurality of elongated holes 20a in each bracket such that the orientation thereof can be varied with respect to the belt running direction.

In addition, in each of positions corresponding to the inner peripheries of the transversely curved portions of the endless belt 11 which are adjacent to the front or rear sides of the horizontal rollers 19 as shown in FIG. 2, there is provided each one vertical roller 21 so as to cross the outward belt 11a or the return belt 11b typically in a state that the vertical roller is orthogonal to the belt to support the tensile force of the belt in abutment against the curved inner peripheral side portion of the belt 11a or 11b as shown in FIG. 4(b) and to maintain the belt in the curved state. The vertical rollers 21 thus provided are rotatably pivoted on upper and lower brackets which are respectively attached to the intermediate coupling rods 18 and the upper and lower outer couplings rods 17 through a plurality of elongated holes 22 which are provided in the individual brackets in the manner shown in FIG. 5B with screw rods 22b in such a manner that the orientation thereof can be varied.

In the above-mentioned arrangement, when the endless belt 11 is driven by the drive roller 12, the belt runs over the driven roller 13 in the flattened state and then acts as the outward belt 11a. Then, the outward belt 11a is gradually rolled by upper deformation rollers (not shown) of the plurality of rolling/unrolling frames 16. In the midst of the rolling of the belt, the conveyed object "m" is put on the outward belt 11a from the hopper "Ha". Then, the belt 11a wraps the object therein, passes alternately over the holding rollers 15 on the periphery of the upper insert passages 14a in the juxtaposed supporting frames 14 and the upper horizontal rollers 19 in the tubularly rolled state in which the side edge 11' thereof is superposed on the side edge 11" thereof as shown in FIG. 3, and then is again unrolled into the flattened state by the upper deformation rollers of the rolling/unrolling frames 16 on the drive roller side in a position that the belt has just passed the frontmost supporting frame 14. Thereafter, the conveyed object "m" is thrown down into the receiving pipe "Hb" during the belt is running over the drive roller 12.

Next, the outward belt 11a turns to the return belt 11b which is, then, again rolled up by the lower deformation rollers of the rolling/unrolling frames 16, alternately passes over the holding rollers 15 on the peripheries of the lower insert passages 14b in the supporting frames 14 and the lower horizontal rollers 19 again in the tubularly rolled-up state, and is unrolled by the lower deformation rollers of the rolling/unrolling frames 16 on the side of the driven roller 13 when it reaches the position in front of the driven roller 13 and runs over the driven roller 13 to complete one cycle.

Figure 6:
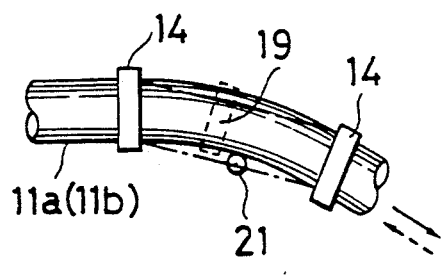
FIG. 6 is an illustration showing that the belt is maintained in the curved state due to the presence of a vertical roller.

In the above mentioned operation, in the central positions between the supporting frames 14 which are juxtaposed one following in on another, there are provided the horizontal rollers 19 so as to support the bottom of each of the outward and return belts 11a and 11b, so that even if the belt intends to sag downward under the weight of the conveyed object or of its own between the supporting frames 14, the horizontal rollers 19 prevent the sagging of the belt. In addition, in the positions corresponding to the curved portions of the belts 11a and 11b, there are provided the vertical rollers 21 corresponding to the horizontal rollers 19 in the middle between the front and rear supporting frames 14 so as to support the inner peripheries of the curved portions of the belts, so that owing to the presence of the vertical rollers 21, contrary to the case with no rollers 21 in which the belts 11a and 11b will run like squarishly curved lines as shown by the chained lines in FIG. 6 and hence the resistance will be increased, the belts 11a and 11b are maintained in arch-shaped form with little resistance as shown by the solid lines in FIG. 6.

In a case that a portion is clockwisely twisted in the belt running direction during the running of the outward belt 11a or the return belt 11b, the horizontal roller 19 corresponding to the twisted portion is inclined as shown by the dotted lines from the state shown by the solid lines by adjusting the orientations of the supporting brackets 20 on the both sides with respect to the belt running direction through the screw rods 20a and the elongated holes 20b as shown in FIG. 5A to apply a counterclockwise rotational force to the belt, by which the twist can be corrected.

Figure 5B:
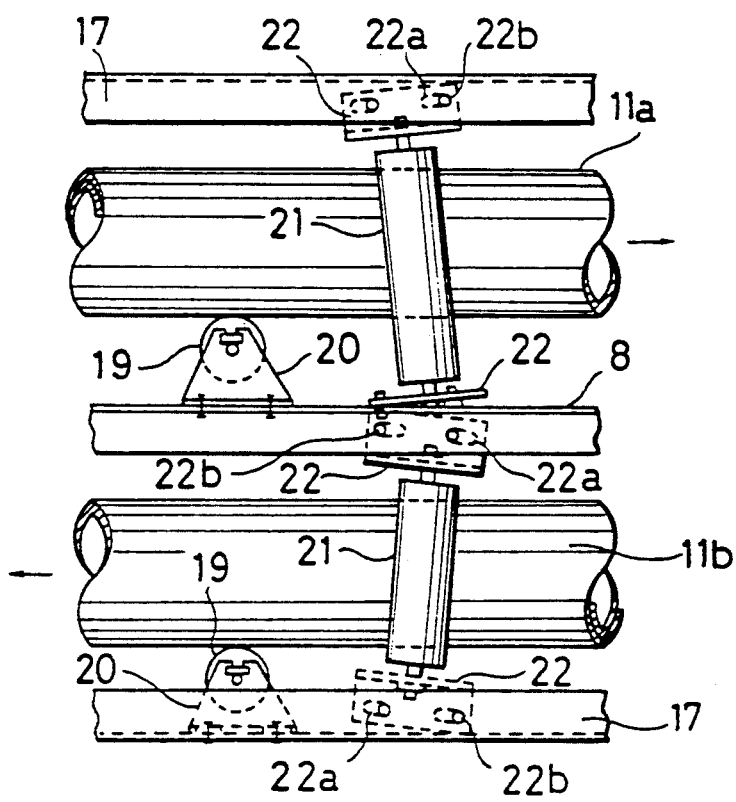
FIG. 5B is a side view viewed from a direction of the line E—E in FIG. 4(b).
Figure 7:
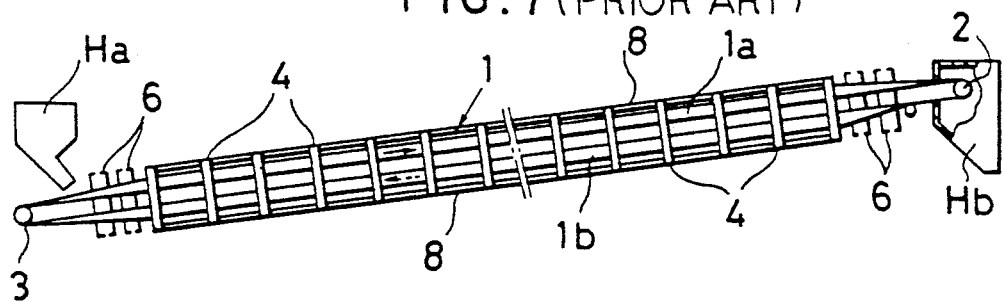
FIG. 7 is a side view of a conventional tubular belt conveyor.
Figure 8:
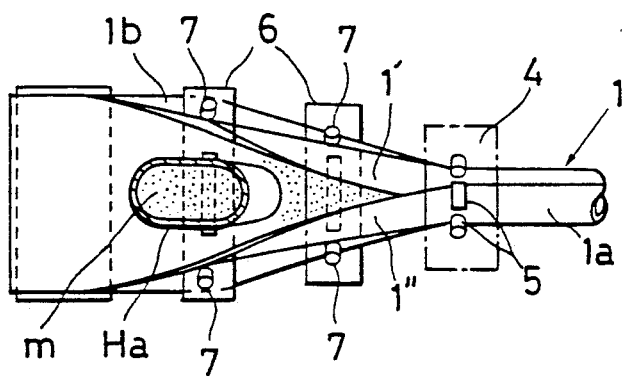
FIG. 8 is a plan view of a portion corresponding to a driven roller of the conventional belt shown in FIG. 7.
Figure 9:
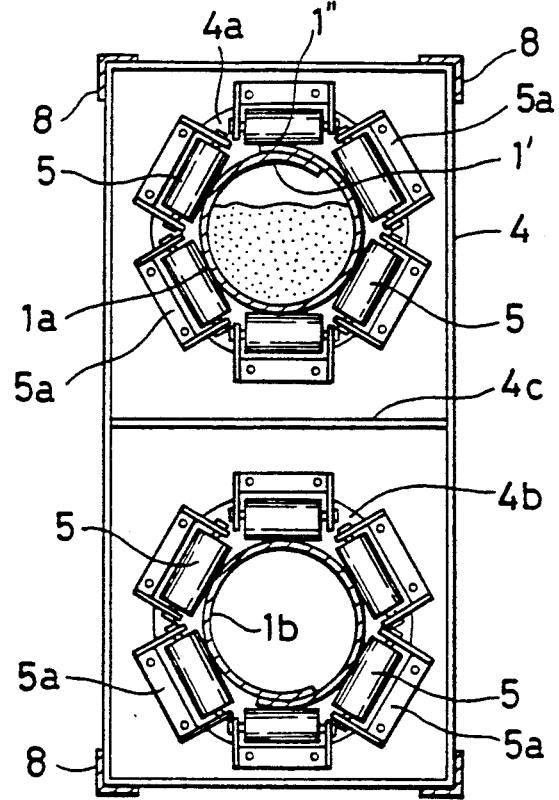
FIG. 9 is a front view of a supporting frame of the belt shown in FIG. 7.
Figure 10A:
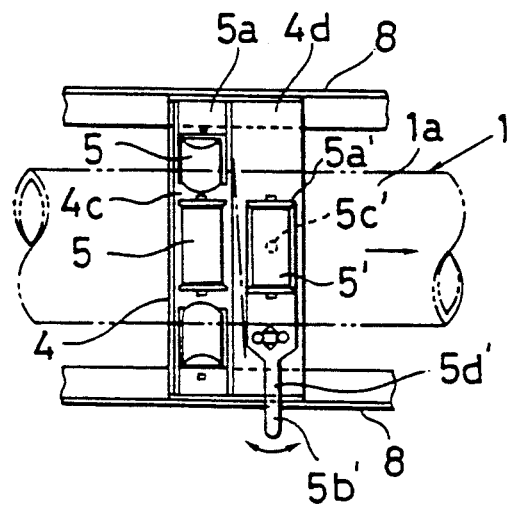
FIG. 10(a) is a plan view of a conventional belt correcting device.
Figure 10B:
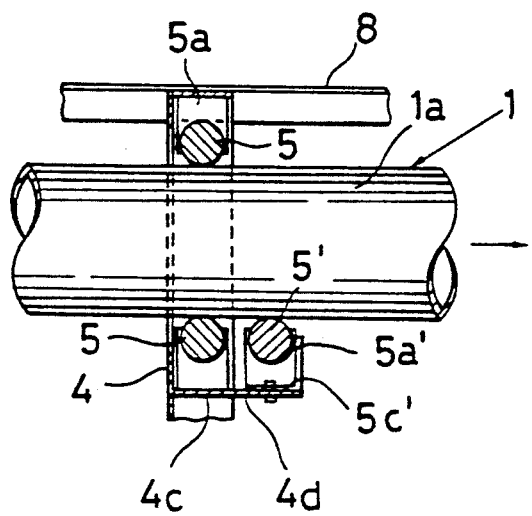
FIG. 10(b) is a side view of the device shown in FIG. 10(a).

In this case, in the curved portions of the belts 11a and 11b, with the horizontal rollers 19 left as they are, the vertical roller 21 corresponding to the twisted portion is inclined as required by varying the orientations of the upper and lower brackets 22 with respect to the belt running direction under the operation of the screw rods 22a and the elongated holes 20b as shown in FIG. 5B to apply the rotational force which is opposite to the twist to the belt, by which the twist of the curved portion can be corrected. In this case, the adjustment of the horizontal roller 19 together with the vertical roller 21 can realize more accurate correction of the belt.

As has been described above, according to the present invention, the tubular belt conveyor of the type in which the endless belt is roller up into the tubular form and the conveyed object is wrapped therein and conveyed to a desired position is constructed as mentioned above. Therefore, the sag of the belt which is apt to be generated in a position between the supporting frames under the weight of the conveyed object or of the belt can be surely prevented by supporting the belt from below by means of the horizontal roller, the inner peripheral side part of the transversely curved portion of the belt is supported by the vertical roller, by which the belt can be maintained in the properly curved state and hence the resistance against the running of the belt can be reduced. In addition, the provision of the horizontal rollers along the entire length of the belt and of the vertical rollers on the curved portion thereof permits to widen the space between the supporting frames having many holding rollers (for example, the space of 1.5 m can be increased to the space of 2.0 to 2.5 m), by which the number of the holding rollers can be economically reduced and in a case that a twist is generated around the axis of the belt during the running thereof, the horizontal of vertical roller corresponding to the twist can be properly inclined with respect to the belt running direction, by which the twist can be readily corrected without stopping the movement of the belt.

The present invention has been described in relation to the preferred embodiment of the present invention. However, the present invention is not limited hereto and many variations and modifications of the invention can be practiced upon consideration of the foregoing disclosure without departing from the scope and spirit of the appended claims, .

What is claimed is:

1. A tubular belt conveyor, comprising,
   an endless belt wound around drive and driven rollers and having upper and lower sections comprising outward and return runs, respectively,
   said upper and lower sections being rolled up by deformation means into tubular form substantially along the entire length of said belt such that an object to be conveyed is wrapped in said outward run and conveyed in a wrapped-in state,
   supporting frames with horizontal rollers being alternately located along the entire length of said tubular formed sections, each of said supporting frames having upper and lower passages through which said upper and lower sections are inserted, a plurality of horizontal holding rollers on said supporting frames; said rollers being located in a central portion between said supporting frames which are juxtaposed so as to support said lower section of said belt orthogonal to said tubularly formed sections, and each of said horizontal holding rollers is pivotally supported on a bracket which is attached to a coupling member of each of said supporting frames in such a manner that the orientation thereof can be varied with respect to a belt running direction, vertical rollers for supporting curved inner peripheral side portions of said outward and return runs adjacent said horizontal rollers for supporting said sections on transversely curved portions of said outward and return runs, each of said vertical rollers being pivotally supported on a bracket which is attached to said coupling member of each of said supporting frames in such a manner that the orientation thereof can be varied with respect to the running direction of said belt.

* * * * *